April 28, 1959     D. I. BOHN     2,884,284
BEARING ASSEMBLY
Filed April 26, 1957

INVENTOR.
DONALD I. BOHN
BY
*Robert T. Teeter*
ATTORNEY

United States Patent Office 2,884,284
Patented Apr. 28, 1959

2,884,284

BEARING ASSEMBLY

Donald I. Bohn, Asheville, N.C., assignor to Aluminum Company of America, Pittsburgh, Pa., a corporation of Pennsylvania Application April 26, 1957, Serial No. 655,338

4 Claims. (Cl. 308—127)

This invention relates to bearings which are lubricated by oil and the like, and more particularly to a novel arrangement for effecting lubricant supply to such a shaft or journal through rotation of a lubricant lifting device.

A principal object of the invention is to provide a means for insuring adequate oil supply to an oil-lubricated shaft bearing, effective promptly upon commencement of operation and at low as well as at high rotational speeds, which means are more effective and reliable than conventional oil lifting devices of the rotational type such as slingers, rings, chains and the like.

Another object is to provide a bearing and lubricating means which functions equally well for either direction of shaft rotation. It is also an object of this invention to provide a bearing assembly which can be operated with a heavy radial loading of the bearing in any direction.

Further, it is an object to provide, in an assembly of the character referred to, a moderated lubricant supply that will insure a copious but not excessive supply of lubricant to the bearing under all normal conditions of operation.

Other objects and advantages of the invention will be apparent from the following detailed description and the accompanying drawing, in which.

Figures 1, 2:
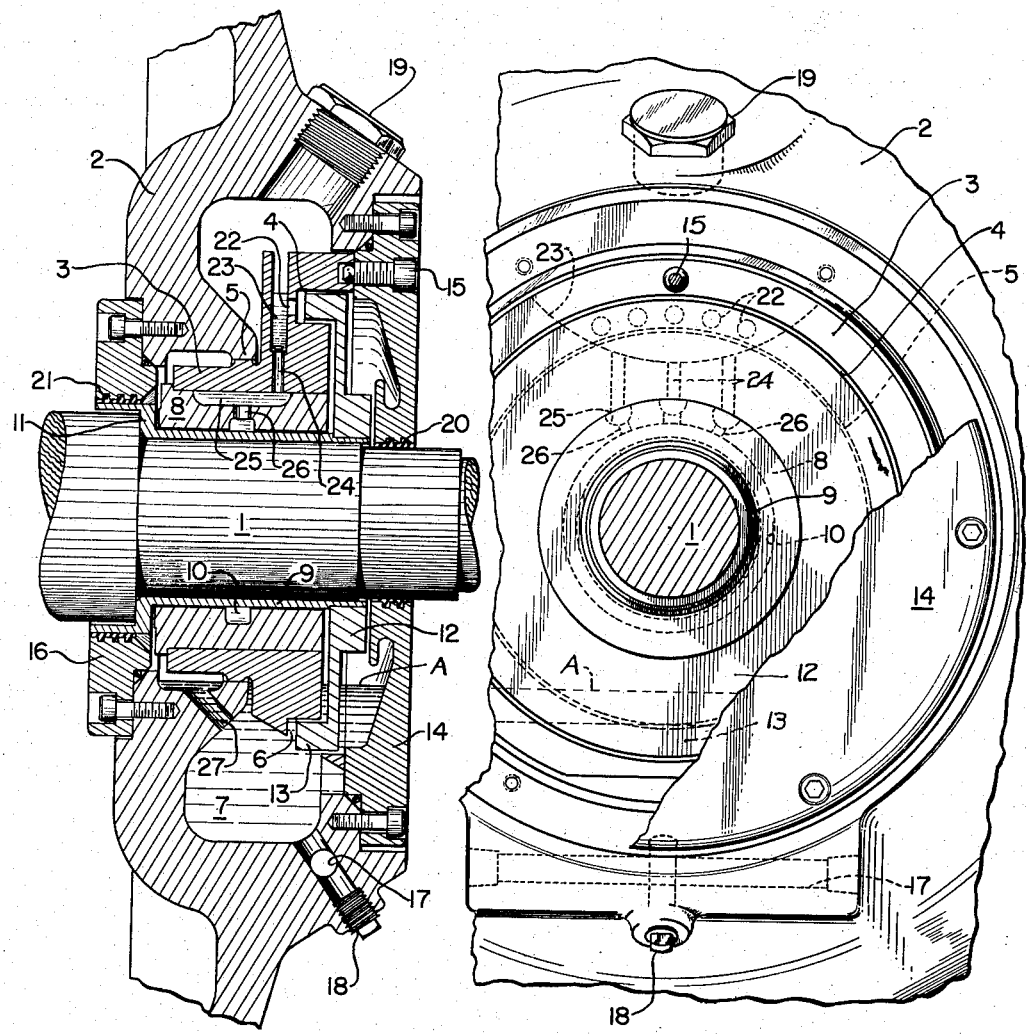
Fig. 1 is a vertical section of a bearing assembly embodying the invention.
Fig. 2 is a fragmentary end view in which a major portion of the outer retainer plate is broken away.

Referring to the preferred embodiment of the invention illustrated in the attached drawing, a shaft 1 is journaled within a housing 2, which may be constructed in any way, and sealed to, or made integral with, any suitable supporting means such as the end portion of an electric motor. Mounted within the bore of the housing 2 is a bearing holder 3, having in its outer face a laterally open annular channel 4 which is concentric with the bearing described below, and having about its center a peripheral land seated within a flange 5 of the housing 2.

It is noted that the method of seating the bearing holder 3 within flange 5 provides a desirable degree of limited self-alignment to compensate for deflection due to load as well as to accommodate manufacturing tolerances.

A section of the lower portion of the bearing holder 3 is chamfered to provide an access passage 6 communicating with the annular channel 4 to admit oil or other liquid lubricant from a lower reservoir 7 in the lower portion of the housing 2. Mounted within the bore of the bearing holder 3 by any suitable method such as press fitting or the like, is a 360° sleeve-type bearing 8. The journal portion of shaft 1 is provided with a hardened sleeve 9 which is rotatably supported in the bearing 8. A peripheral lubricating groove 10 is centrally disposed within the bore of bearing 8. The inner end surface of bearing 8 engages a shoulder 11 on the sleeve 9 which serves to transmit axial load to the bearing.

An oil lifting disc 12 having a laterally disposed, peripheral flange 13, inwardly directed to run in the annular channel 4 of the bearing holder 3, is mounted upon the shaft 1 in any suitable manner whereby the disc will rotate with the shaft.

Forming the outer cover of the assembly is an outer bearing retainer 14 secured to the housing 2 in any suitable fashion, such as by machine screws. A dog-ended lock screw 15 mounted in the outer retainer 14 extends into a recess in the outer face of the bearing holder 3 to prevent rotation thereof, but to accommodate limited variation in alignment. Forming the inner seal of the assembly is an inner retainer 16 secured to the housing 1 in any suitable fashion, such as by machine screws.

The inner and outer retainers 14 and 16 are sealed to prevent oil leakage by any suitable means including, for example, labyrinth seals 20 and 21.

An external lubricant supply device may be employed to feed lubricant into the lower reservoir 7 through one or more inlets 17 in the base of the housing 2 to maintain the desired lubricant level preferably above the lower run of channel 4, as indicated by line A. An oil drain 18 may be provided at the base of the housing 2. An oil sight gauge 19 may also be provided in the upper bearing housing.

Referring now to the lubricant passages, the upper portion of the bearing holder 3 opposite the annular channel 4, has one or more lubricant passages or feeds 22 communicating with channel 4 and from which the transported lubricant is discharged into an upper reservoir 23, thence through one or more passages 24 in the bearing holder 3 into one or more lubricant feed passages comprising basins 25 in the bearing 8, and one or more holes 26 leading to the lubricating groove 10 of the bearing. In the lower portion of the housing 2, one or more drain passages 27 are provided for the oil to drain from the inner end of the bearing 8 through the chamber formed by the flange 5. Oil may drain from the outer end of the bearing 8 downwardly between the outer end of the bearing 8 and the inner face of the disc 12.

The annular channel 4 of the bearing holder 3 is so constructed as to provide for receiving therein the flange 13 of the oil lifting disc 12 with relatively small radial clearances between the inner and outer side surfaces of each. The horizontal depth of the channel is conveniently such as to provide a somewhat larger axial clearance between the end face of the flange and the base of the channel, and it has been found that such clearance may be adequate to allow for the usually unavoidable axial play of the shaft without impairment of the oil lifting function described below.

Considering now the mode of operation, the inner and outer side surfaces of the flange 13 of the oil-lifting disc 12 are in close proximity to the inner and outer side surfaces of the channel 4 in the bearing holder 3. Lubricant from the lower reservoir 7 flows between these co-operating surfaces at the lower portions and films of lubricant cling thereto by reason of the surface tension of the lubricant in the confined spaces. The rotation of the flange 13 relative to the stationary channel 4 tends to "drag" or "roll," and thus carry, the lubricant between these surfaces from the lower to the upper portion of channel 4.

In the course of travel, the films of lubricant naturally tend to spread and in so doing traverse the end of the flange 13. Thence, the lubricant flows through the feeds 22 into the upper reservoir 23. It then flows through the passages 24 of the bearing holder 3 into the basins 25 of the bearing 8, from which it further descends through holes 26 into the lubricating groove 10. The lubricant then spreads out between the bearing 8 and the journal sleeve 9, and the excess lubricant drains out at either end of the bearing and ultimately descends back to the lower reservoir 7.

To effect the "dragging" or "rolling" of the oil between the side surfaces of flange 13 and of channel 4 to the upper portions thereof, there are relatively small radial running clearances between the flange side surfaces and the channel side surfaces so that lubricant may flow therebetween and cling thereto. The optimum running clearances will depend largely upon the size of the bearing, its intended operating speed range, and the viscosity and clinging characteristics of the particular oil or similar lubricant to be used, and satisfactory running clearances may be readily determined by trial. It has been found that such clearances, with ordinary motor bearing oil, for example, may conveniently be about 1/32", so that no unusual manufacturing tolerances need be provided for.

The oil-lifting function of the disc 12 is not dependent upon having a narrow axial clearance between the end of the flange 13 and the base of the channel 4. Thus, a substantial clearance, such as about 3/32", may be provided to allow for the axial play of the shaft.

It has further been observed that oil-lifting devices of the type described herein may readily be so proportioned as to maintain a substantially uniform supply of lubricant in the upper reservoir 23.

As an example, a bearing assembly made in accordance with the preferred construction as described above was employed on a 2" shaft journal rotating at speeds of up to 3600 r.p.m. and with belt loadings developing up to 400 p.s.i. on the bearing. The lubricant utilized in this particular assembly was S.A.E. 30 oil.

Even at high speeds there was no excessive oil introduced into the upper bearing assembly as contrasted with the flooding which is common to centrifugal slingers and lifting scoops or plates. It was further observed that this device delivered oil to the upper reservoir and thence to the bearing surface within the first three revolutions at the commencement of operation.

A particular preferred embodiment of the invention has been shown and described above, but it will be obvious that various modifications may be made within the scope of the invention, and it is to be understood that the invention is not restricted to the specific details of construction shown but includes all equivalent embodiments and modifications.

What is claimed is:

1. A bearing assembly comprising a bearing, means surrounding said bearing having a laterally open annular channel concentric with said bearing, a lubricant-lifting disc having a laterally disposed flange arranged to run in said annular channel, the sides of said flange co-operating with the sides of said annular channel to provide running clearances which are such that the lubricant is rolled or dragged from the lower to the upper portion of said channel during rotation of the said lubricant-lifting disc, and a lubricant reservoir below said bearing, said means surrounding said bearing having a passage in the lower portion thereof communicating with said channel to admit lubricant from said reservoir and having a passage in the upper portion thereof communicating with said channel to discharge lubricant for delivery to said bearing.

2. A bearing assembly comprising a shaft, a bearing having a centrally disposed, peripheral lubricating groove and a feed passage leading thereto in the upper portion of said bearing, supporting means surrounding said bearing having a laterally-open annular channel concentric with said bearing, a lubricant-lifting disc mounted on said shaft and having a laterally disposed flange arranged to run in said annular channel, the sides of said flange co-operating with the sides of said annular channel to provide running clearances which are such that the lubricant is rolled or dragged from the lower to the upper portion of said channel during rotation of the said lubricant-lifting disc, and a housing within which said supporting means is centrally seated and having a lubricant reservoir in the lower portion thereof below said bearing, said supporting means having a passage in the lower portion thereof communicating with said channel to admit lubricant from said reservoir and having an upper reservoir therein communicating with the upper portion of said channel and further communicating with said feed passage in said bearing.

3. A bearing assembly comprising a bearing, means surrounding said bearing having a laterally open annular channel concentric with said bearing, a lubricant-lifting disc having a laterally disposed flange arranged to run in said annular channel with a small running clearance between the sides of said flange and the sides of said channel, said clearance being such that the lubricant is dragged or rolled from the lower to the upper portion of said channel during rotation of the said lubricant-lifting disc, and a lubricant reservoir below said bearing, the lower portion of said channel communicating with said reservoir to admit lubricant from said reservoir, and said means surrounding said bearing having a passage in the upper portion thereof communicating with said channel to discharge lubricant for delivery to said bearing.

4. A bearing assembly comprising a shaft, a bearing having a peripheral lubricating groove and a feed passage leading thereto in the upper portion of said bearing, supporting means surrounding said bearing having a laterally-open annular channel concentric with said bearing, a lubricant-lifting disc mounted on said shaft and having a laterally disposed flange arranged to run in said annular channel with a small running clearance between the sides of said flange and the sides of said channel, said clearance being such that the lubricant is dragged or rolled from the lower to the upper portion of said channel during rotation of the said lubricant-lifting disc, and a housing within which said supporting means is seated, said housing having a lubricant reservoir therein below said bearing communicating with the lower portion of said channel to admit lubricant from said reservoir and an upper reservoir therein communicating with the upper portion of said channel and further communicating with said feed passage in said bearing for delivery of lubricant to said bearing.

References Cited in the file of this patent

UNITED STATES PATENTS

| 2,023,764 | Howarth | Dec. 10, 1935 |

FOREIGN PATENTS

| 318,806 | Italy | July 21, 1934 |
| 932,394 | Germany | Sept. 1, 1955 |